United States Patent
Boicelli

(10) Patent No.: US 12,090,425 B2
(45) Date of Patent: Sep. 17, 2024

(54) FILTER DEVICE FOR FILTERING EXTRUDED POLYMERS AND CLEANING METHOD

(71) Applicant: BD PLAST FILTERING SYSTEMS S.R.L., BONDENO (IT)

(72) Inventor: Dante Boicelli, Bondeno (IT)

(73) Assignee: BD PLAST FILTERING SYSTEMS S.R.L., Bondeno (IT)

( * ) Notice: Subject to any disclaimer, the term of this patent is extended or adjusted under 35 U.S.C. 154(b) by 0 days.

(21) Appl. No.: 18/476,996

(22) Filed: Sep. 28, 2023

(65) Prior Publication Data
US 2024/0017193 A1  Jan. 18, 2024

Related U.S. Application Data

(62) Division of application No. 17/486,046, filed on Sep. 27, 2021, now Pat. No. 11,980,836.

(30) Foreign Application Priority Data

Oct. 15, 2020  (IT) .......................... 102020000024343

(51) Int. Cl.
 *B01D 29/66* (2006.01)
 *B01D 29/05* (2006.01)
 (Continued)

(52) U.S. Cl.
 CPC ............. *B01D 29/66* (2013.01); *B01D 29/05* (2013.01); *B01D 29/96* (2013.01); *B01D 35/12* (2013.01); *B01D 35/16* (2013.01)

(58) Field of Classification Search
 CPC ........ B01D 29/66; B01D 29/05; B01D 29/96; B01D 35/12; B01D 35/16; B29C 48/2545; B29C 48/273; B29C 48/6912
 See application file for complete search history.

(56) References Cited

U.S. PATENT DOCUMENTS 3,613,564 A * 10/1971 Adamski ................... F23G 5/30
                                                       100/153
4,725,215 A    2/1988 Kreyenborg et al.

FOREIGN PATENT DOCUMENTS

CN       107031016      8/2017
EP        0554237       4/1996

* cited by examiner

*Primary Examiner* — Waqaas Ali
(74) *Attorney, Agent, or Firm* — Pearne & Gordon LLP; J. Gregory Chrisman

(57) ABSTRACT

Filter device (1) for filtering extruded polymers comprising a containment body (2) defining at least one cavity (3), an inlet opening (4) in fluid communication with the cavity (3) via a respective inlet conduit (5), and an outlet opening (6) in fluid communication with the cavity (3) via a respective outlet conduit (7), and a support body (8) slidably inserted in the cavity (3) and interposed between the respective inlet conduit (5) and the respective outlet conduit (7) and having a seat (9) for housing a filter assembly (10) consisting of two perforated disks (11) and a filter screen located between the two perforated disks (11). The seat (9) has an inlet section (13a) having dimensions equal to an outlet mouth (5a) of the inlet conduit (5), and an outlet section (12a) with dimensions that are larger than the dimensions of the inlet section (13a) and equal to a maximum extension of an inlet mouth (7a) of the outlet conduit (7).
The support body (8) is slidably movable in the cavity (3) along a main direction of movement (L) so as to produce different partializations of the perforated disk (11) associated with the outlet section (12a) of the seat (9).

6 Claims, 6 Drawing Sheets

(51) Int. Cl.
*B01D 29/96* (2006.01)
*B01D 35/12* (2006.01)
*B01D 35/16* (2006.01)

FILTER DEVICE FOR FILTERING EXTRUDED POLYMERS AND CLEANING METHOD

CROSS-REFERENCE TO RELATED APPLICATIONS

This is a divisional of application Ser. No. 17/486,046, filed on Sep. 27, 2021, incorporated herein by reference in its entirety.

The present invention relates to a filter device for filtering extruded polymers.

Furthermore, the present invention relates to a cleaning method for cleaning the aforesaid filter device which envisages a backflush type cleaning of the filter screens.

In filter devices with backflush cleaning systems, a certain amount of already filtered material, at high pressure, is conveyed towards the filter surfaces to be cleaned in the opposite direction with respect to the normal working direction, so as to remove the impurities deposited in the surfaces thereof.

According to how much dirt is accumulated in a filter assembly, it is necessary to increase the pressure to detach and drain the material.

Disadvantageously, the screens of filter assemblies do not tolerate excessive increases in pressure, therefore risking breakage.

Furthermore, with excessively high pressure, the polymer could suffer, even reaching the breakage of the polymer chain.

In the state of the art the existing solutions, due to the nature of their geometry, are affected by the limited cleaning strength (effective pressure and flow rate) of the screen by the cleaned polymer and the geometries of the conduits can cause stagnation of the treated material.

The technical task of the present invention is thus to provide a filter device and cleaning method able to overcome the drawbacks which have emerged from the prior art.

The object of the present invention is therefore that of providing a filter device and cleaning method that enable effective cleaning of the filter assemblies of the filter device itself to be obtained.

A further object of the present invention is therefore that of providing a filter device and cleaning method that enable possible breakages of the filter screens and the breakage of the polymer chain to be prevented.

A further object of the present invention is therefore that of providing a filter device and cleaning method that enable the formation of stagnations that can lead to wear on the filter assembly and/or the filter device as a whole to be prevented.

The technical task set and the objects specified above are substantially attained by a filter device and cleaning method, comprising the technical characteristics as set out in one or more of the accompanying claims. The dependent claims correspond to possible embodiments of the invention.

Further features and advantages of the present invention will become more apparent from the indicative and thus non-limiting description of an embodiment of a filter device and cleaning method.

Such a description will be set out below with reference to the appended drawings, which are provided solely for illustrative and therefore non-limiting purposes, in which.

Figure 1:
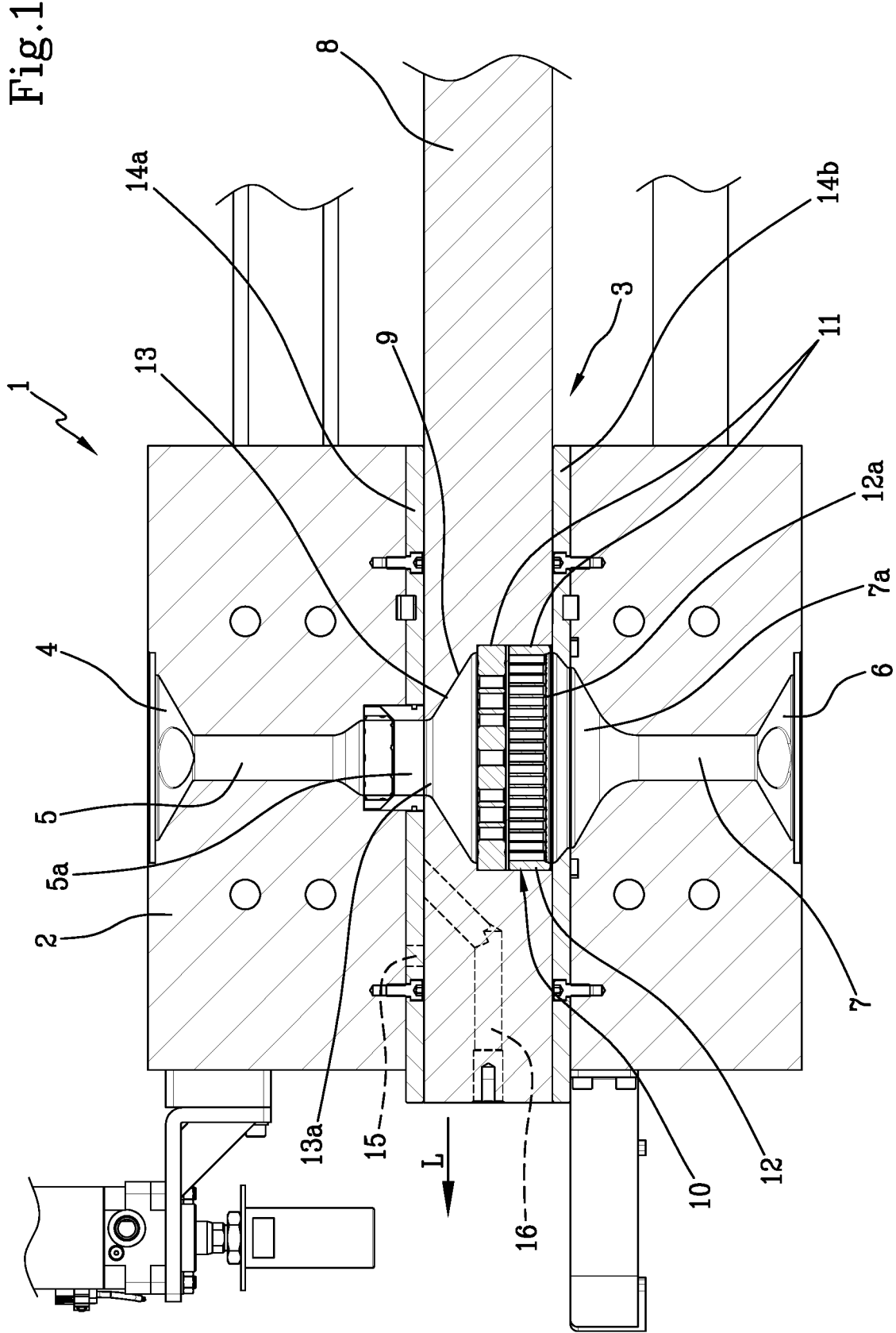
FIG. 1 is a sectional view of a filter device according to the present invention.
Figure 2:
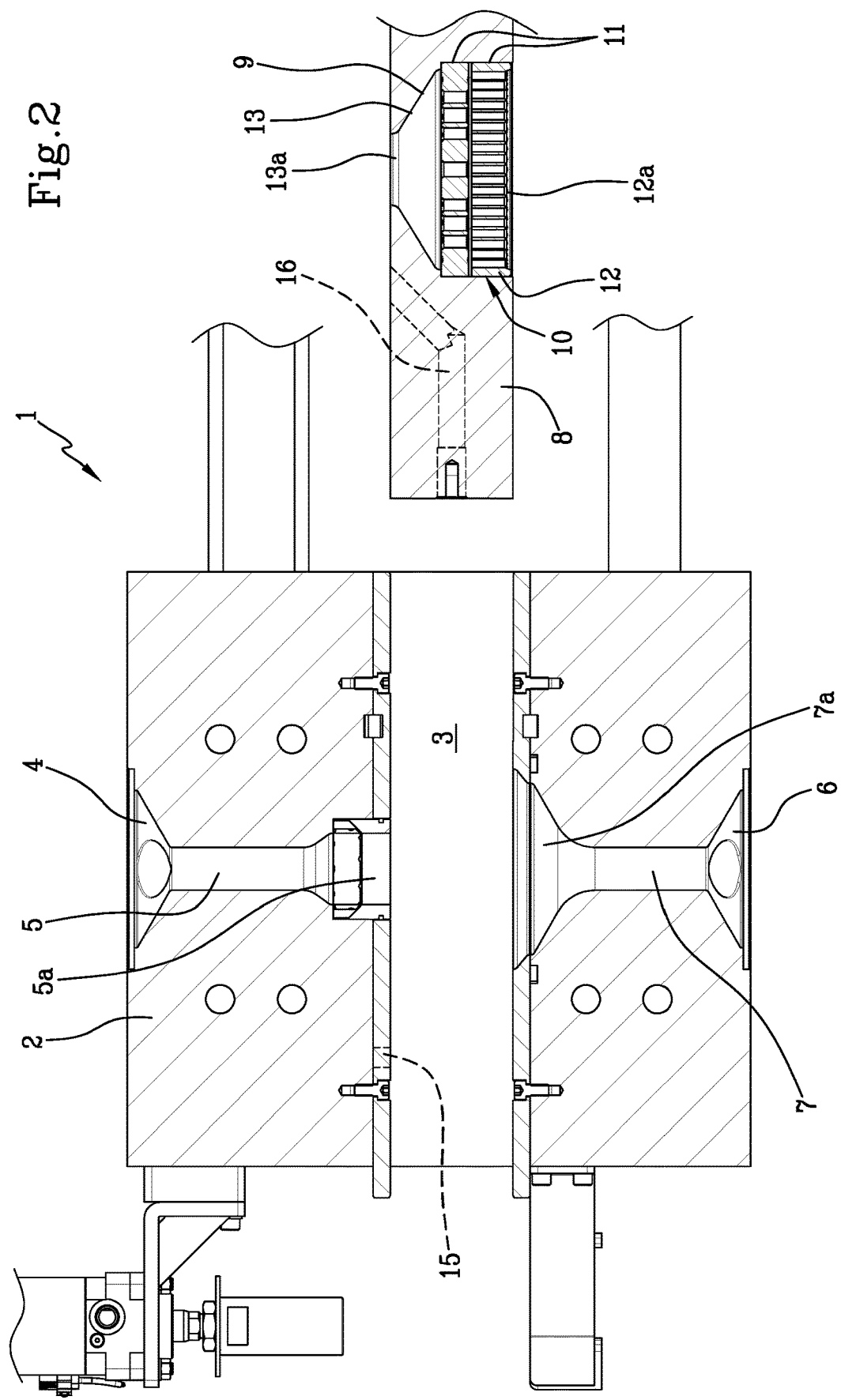
FIG. 2 is a sectional view of the filter device of FIG. 1 with some parts removed in order to better illustrate others.

With reference to the appended figures, 1 indicates in its entirety a filter device for filtering extruded polymers which, for simplicity of description, will be referred to below as the filter device 1.

The filter device 1 comprises a containment body 2, preferably made of steel and having a prismatic shape. The containment body 2 defines at least one cavity 3 with a rectilinear longitudinal extension and with a rectangular cross section. Preferably, as shown for example in FIG. 6, the containment body 2 defines three cavities 3 which extend mutually parallel along a short side of the rectangular section of the containment body 2. The filter device 1 can have any number of cavities 3, e.g. at least two in order to guarantee the continuity of flow in a cavity where the other is subjected to a cleaning process. In the illustrated example there are three filter cavities 3.

Preferably, and as shown in the appended figures, the cavity 3 (or cavities 3 if there is more than one) passes through the containment body 2.

The containment body 2 further has an inlet opening 4 in fluid communication with the cavity 3 via a respective inlet conduit 5, and an outlet opening 6 in fluid communication with the cavity 3 via a respective outlet conduit 7.

For each cavity 3, therefore in the event that there are at least two of them, there is a respective inlet opening 4 and outlet opening 6 in fluid communication with each cavity 3 through respective inlet 5 and outlet 7 conduits.

The inlet opening 4 and the outlet opening 6 open onto respective faces of the containment body opposing each other and parallel to the longitudinal extension of the cavities 3.

The filter device 1 further comprises a support body 8 slidably inserted in the cavity 3 and interposed between the respective inlet conduit 5 and outlet conduit 7.

The support body 8 is defined by an elongated prism, preferably made of steel, with a cross section counter-shaped to the cavity 3 in which it has to slide.

The support body 8 has a seat 9 for housing a filter assembly 10.

Each filter assembly 10 consists of two perforated disks 11 and a filter screen located between the two perforated disks 11.

The seat 9 of the support body 8 has a substantially cylindrical portion 12 counter-shaped to the filter assembly 10 and associated with the respective outlet conduit 7 and a truncated cone shaped portion 13 coaxial and connected to the cylindrical portion 12 and tapered towards the respective inlet conduit 5.

In other words, the seat 9 has an inlet section 13a having dimensions equal to an outlet mouth 5a of the inlet conduit 5, and an outlet section 12a with dimensions that are larger than the dimensions of the inlet section 13a and equal to a maximum extension of an inlet mouth 7a of the outlet conduit 7.

In other words, the seat 9 has a smaller section than the truncated cone shaped portion 13 having the same dimensions as an outlet mouth 5a of the inlet conduit 5 and a maximum section having the same dimensions as the inlet mouth 7a of the outlet conduit. The inlet mouth 7a also has a substantially truncated cone shaped conformation.

Preferably, the cavity 3 has two slide guides 14a, 14b on which the support body 8 is slidably movable. Even more preferably, each slide guide (14a and 14b) is made in the form of bronze plates.

As shown for example in the appended figures, the two slide guides 14a and 14b define the outlet mouth 5a of the inlet conduit 5 and the inlet mouth 7a of the outlet conduit 7, respectively. In other words, the two slide guides 14a and 14b are respectively positioned above and below the cavity 3.

The support body 8 is slidably movable in the cavity 3 along a main direction of movement "L" so as to produce different partializations of the perforated disk 11 associated with the outlet section 12a of the seat 9 with respect to the inlet mouth 7a of the outlet conduit 7 in order to obtain different interferences of the perforated disk 11 with the inlet mouth 7a of the outlet conduit 7.

Figure 3:
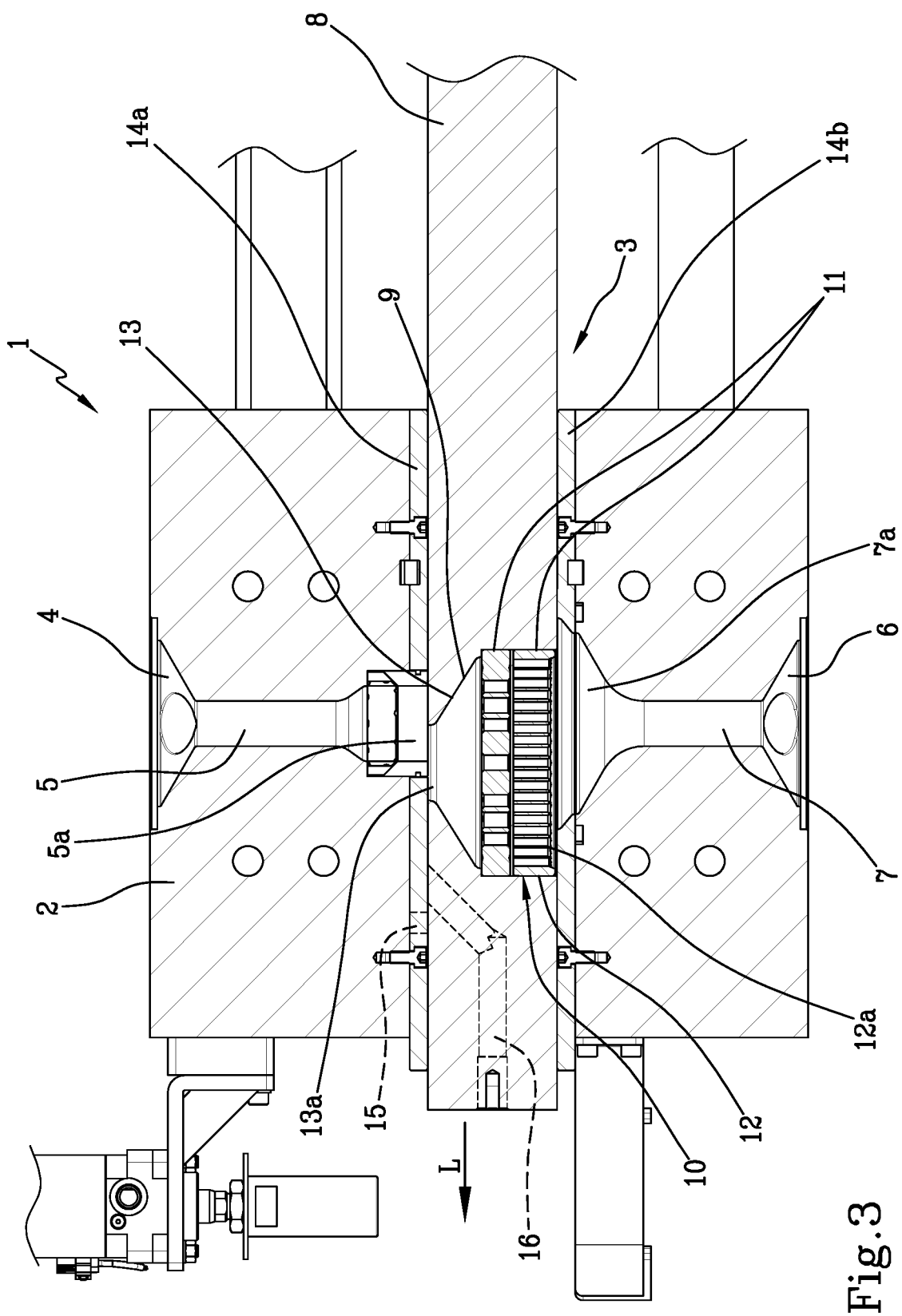
FIGS. 3-5 are sectional views of the filter device of FIG. 1 according to different operating configurations.
Figure 4:
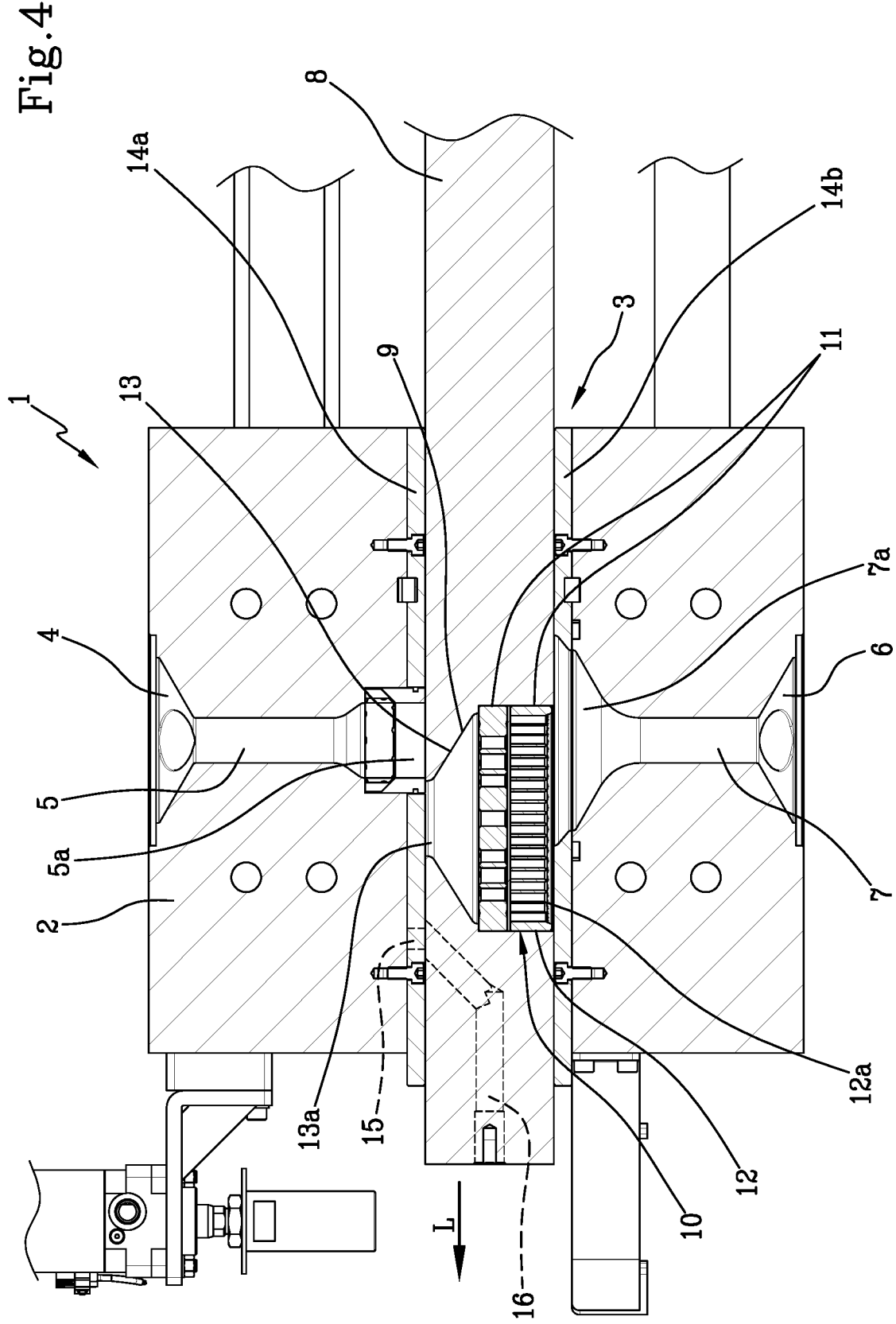
Figure 5:
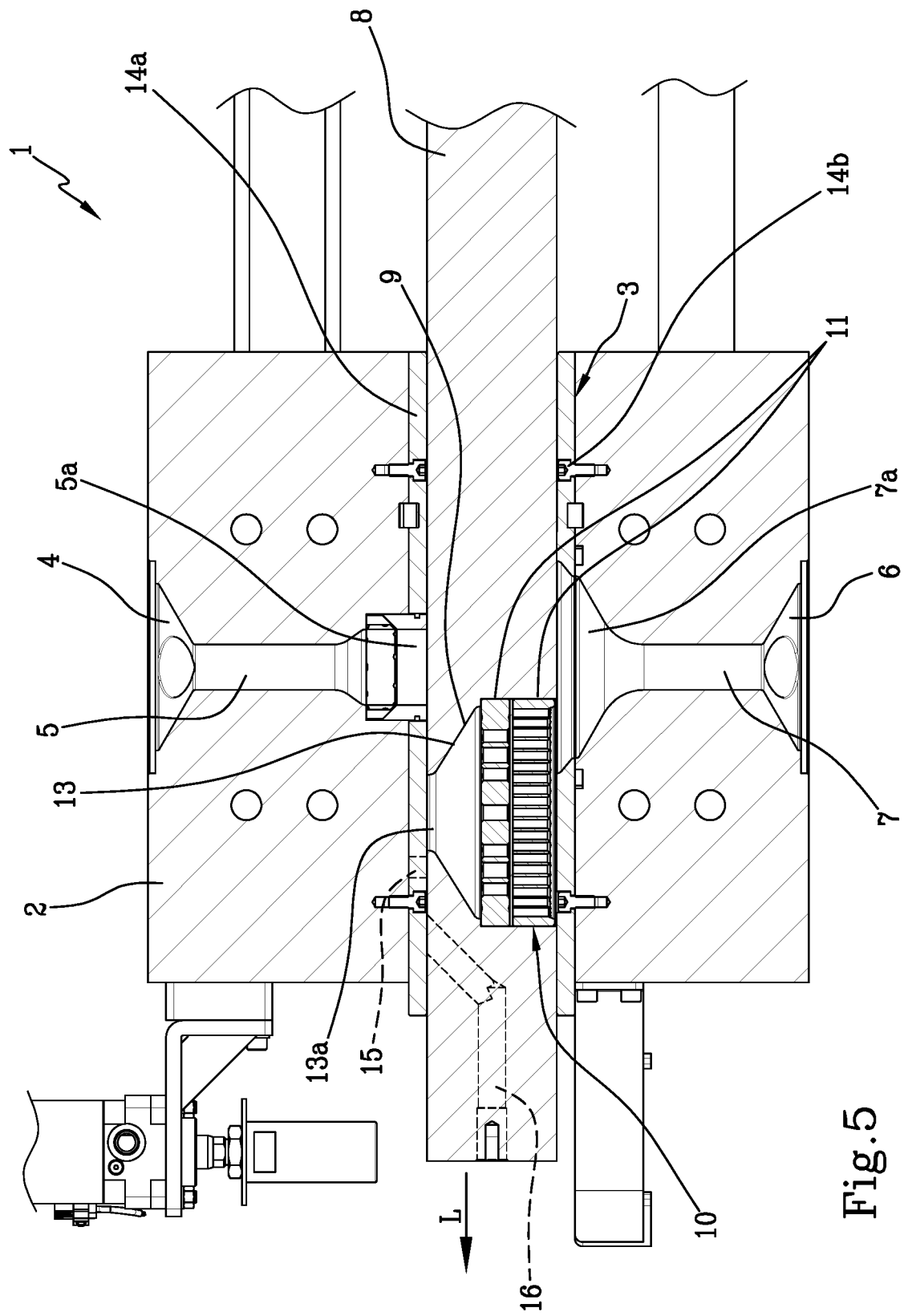

In other words, the movement of the support body 8 along the main direction of movement "L" enables different misalignments to be obtained between the inlet mouth 7a and the seat 9 (as well as, for obvious reasons, the filter body 10 and the respective perforated disks 11) as shown in FIGS. 3-5.

The aforesaid different misalignments and their utility shall be described in more detail in the continuation of the present description with reference to a cleaning method for cleaning the filter device 1 which envisages a backflush type cleaning of the filter screens.

At least the slide guide 14a has at least one auxiliary channel 15 configured to place the inlet section 13a of the seat 9 in fluid communication with a drainage channel 16 of the filter device when the support body 8 is in a drainage position. Drainage position means a position of the support body 8 coinciding with a minimal intersection of the perforated disk 11 with the inlet mouth 7a of the outlet conduit 7 as, for example, shown in FIG. 5.

Preferably, the drainage channel 16 is made in the support body 8.

Advantageously, the auxiliary channel 15 and the drainage channel 16 are disjointed from the inlet conduit 5 thus preventing the formation of stagnation areas which are also a source of pollution.

Preferably, the slide guide 14a comprises at least two auxiliary conduits 15 and the filter device 1 comprises the same number of drainage channels 16 (i.e. the support body 8) associated with the auxiliary conduits 15.

Figure 6:
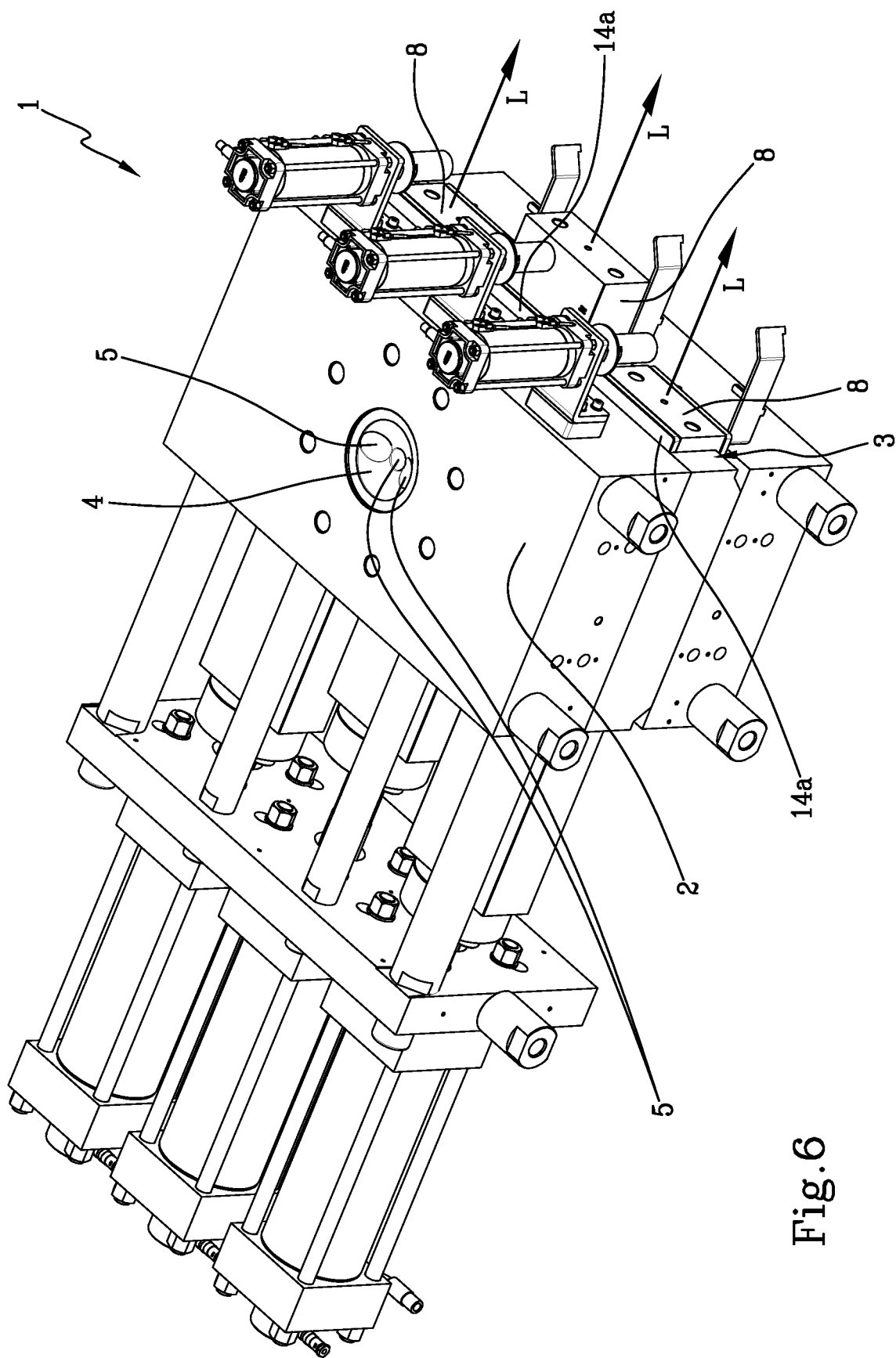
FIG. 6 is a perspective view of a filter device according to the present invention.

As previously described and as shown in FIG. 6, the containment body 2 preferably comprises at least three cavities 3 and respective inlet 5 and outlet 7 conduits for placing in fluid communication the inlet 4 and outlet 6 openings with the cavities 3. For each cavity 3, the filter device 1 preferably comprises the same number of support bodies 8 independent from one another.

The present invention also relates to a cleaning method of the backflush type for a filter device 1 such as the one previously described.

In other words, the filter device 1 is configured to perform a cleaning method such as the one described below and in particular in the performance of specific steps of the method itself.

To understand the cleaning method better, the term backflush means a flow of the molten polymer in the opposite direction to the flow performed by the filter device 1 during the normal activity thereof. In other words, in normal work conditions the filter device 1, configured according to the configuration of FIG. 1 in which the filter body 10 is aligned through the seat 9 with the inlet 5 and outlet 7 conduits, envisages a work flow that runs from the inlet opening 4 to the outlet opening 6. Therefore, the term backflush is intended to mean a flow opposite the normal work activity one, i.e. a flow that goes back from the outlet opening 6.

In other words, the method comprises a step that envisages reversing the flow of the molten polymer in the filter device 1 in order to perform the backflush type cleaning.

The method further envisages a movement step for moving the support body 8 along the main direction of movement "L" so as to perform a first partialization of the perforated disk 11 (i.e. of the filter body 10) with respect to the inlet mouth 7a of the outlet conduit 7 as shown in FIG. 3. In other words, such movement step envisages passing from one configuration such as that of FIG. 1 to a configuration such as that of FIG. 3.

Preferably, said first partialization is carried out so that the perforated disk 11 interferes for 70% of a maximum extension thereof with the inlet mouth 7a of the outlet conduit 7.

Preferably, the first partialization is carried out by moving the support assembly 8 by a dimension equal to a dimension of the inlet section 13a of the seat 9 housing the filter assembly 10, so that the inlet section 13a does not interfere with the outlet mouth 5a of the inlet conduit 5 of the cavity 3. In other words, the support assembly 8 is moved inside the cavity 3 for a distance equal to the inlet section 13a of the seat 9 along the main direction of movement "L".

Such movement step is followed by a flooding step with the molten polymer of the filter assembly 10 so that the screen is flooded and hit for performing a first cleaning thereof. In other words, the two steps just described envisage making a "small" movement of the support assembly 8 to make a "small" partialization of the filter assembly 10 (i.e. of the perforated disk 11) and a subsequent flooding of the screen by the backflush performed for cleaning the filter assembly 10.

In such first movement step the flow rate of material introduced into the filter assembly 10 is not excessive so as not to discard too much material that would otherwise be lost.

Advantageously, such first movement and flooding of the filter assembly 10 enables the dirt accumulated in the filter assembly 10 to be moved with reduced polymer waste.

This is followed by a further movement step for moving the support body 8 so as to produce one or more further partializations of the filter assembly 10 in order to further reduce an interference of the perforated disk 11 with respect to the inlet mouth 7a of the outlet conduit 7.

During such further movement steps it is envisaged to drain the cleaning waste product from the screen.

FIG. 4 shows one of such further movements of the support body 8 in which the interference between the perforated disk 11 and the inlet mouth 7a of the outlet conduit 7 is further reduced. In such configuration of the filter device 1 the seat 9 is at least partially facing the auxiliary conduits 15 so as to drain the dirt from the screen through the drainage conduits 16 (which are open so as to generate a flow between the outlet opening 6 and the drainage conduits 16 themselves).

In such step the dirt detached from the screen is drained, leading to greater waste of material than in the previous step which is however optimised in order to obtain greater cleaning efficacy.

Advantageously, such second movement step (or first further movement) of the filter assembly 10 enables good removal of dirt with controlled polymer waste.

Likewise, FIG. 5 shows a further movement of the support body 8 so that the interference between the perforated disk 11 and the inlet mouth 7a of the outlet conduit 7 is further reduced. In such configuration, the method envisages a step of producing a hammer effect. Such step follows the drainage of the waste product after the cleaning performed in the configuration of FIG. 4 and consists of a first sub-step in which the molten polymer is kept under pressure so as not to be released and a second sub-step in which the molten polymer is made to flow out again to eliminate the possible waste materials still present in the filter assembly 10. In other words, in such configuration the drainage conduits 16 are to be kept closed for a limited period of time necessary to prevent any breakages of the filter screen and the breakage of the polymer chain and to be opened in order to pour out the waste product.

Preferably, the step of producing a hammer effect can also be carried out in the configuration of FIG. 4.

Advantageously, the maintenance of the filter assembly 10 under pressure for a sufficient amount of time and the subsequent opening of the drainage conduits 16 enable the definitive detachment of the material that may still be in the filter assembly 10 leading to optimal cleaning of the filter assembly 10 itself.

The above method can be performed cyclically on just one filter assembly 10 to have a lesser impact on the constancy of the flow leaving the openings 6, or simultaneously for several filter assemblies 10 where necessary.

Advantageously, between the internal components of the filter device 1 such as the plates 14a and 14b and the containment body 2 or between the support body 8 and the plates 14a and 15b there is a distance of a few millimetres (generally 1 or 2 mm) therefore during the backflush cleaning there are insignificant movements between the surfaces which cannot lead to breakages or damage of the filter device 1 itself.

Advantageously, the present invention is able to overcome the drawbacks which have emerged from the prior art.

Advantageously, the filter device 1 and the cleaning method enable effective cleaning of the filter assemblies 10 of the filter device 1 itself to be obtained.

Advantageously, the filter device 1 and the cleaning method enable any possible breakages of the filter screens and the breakage of the polymer chain to be prevented.

Advantageously, the filter device and the cleaning method enable the formation of stagnations that can lead to wear on the filter assembly 10 and/or the filter device 1 as a whole to be prevented.

In particular, in the backflush cleaning step, the exposure of the filter assembly 10 with respect to the inlet mouth 7a is very direct, enabling high pressure and backflush flow to be obtained, with respect to the solution of the prior art.

The invention claimed is:

1. A cleaning method for a filter device for filtering extruded polymers, the filter device comprising:
a containment body defining at least one cavity, an inlet opening in fluid communication with said cavity via a respective inlet conduit, and an outlet opening in fluid communication with said cavity via a respective outlet conduit;
a support body slidably inserted in said cavity and interposed between the respective inlet conduit and the respective outlet conduit and having a seat for housing a filter assembly consisting of two perforated disks and a filter screen located between the two perforated disks, said seat having an inlet section of the same dimensions as an outlet mouth of the inlet conduit, and an outlet section having dimensions that are larger than the dimensions of the inlet section and equal to a maximum extent of an inlet mouth of the outlet conduit;
characterized in that said support body is slidably movable in said cavity along a main direction of movement so as to produce different partializations of the perforated disk associated with the outlet section of the seat with respect to the inlet mouth of the outlet conduit in order to obtain different interferences of the perforated disk with the inlet mouth of the outlet conduit;
the cleaning method comprising the steps of:
reversing a flow of melted polymer in said filter device in order to perform a cleaning of the filter screen;
moving the support body of said filter device so as to produce a first partialization of the perforated disk with respect to the inlet mouth of the outlet conduit;
flooding said filter assembly with said melted polymer so as to flood the filter screen located between the two perforated disks of the filter assembly to move an accumulation of dirt in the filter assembly;
moving said support body so as to produce one or more further partializations of the filter assembly in order to further reduce an interference of the perforated disk with respect to said inlet mouth of the outlet conduit;
draining the dirt from the filter screen.

2. The cleaning method according to claim 1, wherein said first partialization is carried out so that the perforated disk interferes for 70% of a maximum extent thereof with said inlet mouth of the outlet conduit.

3. The cleaning method according to claim 1, wherein said first partialization is carried out by moving the support body by a dimension equal to a dimension of the inlet section of the seat housing the filter assembly, so that the inlet section does not interfere with the outlet mouth of the inlet conduit in the cavity.

4. The cleaning method according to claim 1, further comprising a step of producing a hammer effect, following said step of draining the waste product, consisting of a first sub-step in which the melted polymer is kept under pressure so as not to be released and a second sub-step in which the melted polymer is made to flow out again to eliminate the possible waste material still present in the filter assembly.

5. The cleaning method according to claim 2, further comprising a step of producing a hammer effect, following said step of draining the waste product, consisting of a first sub-step in which the melted polymer is kept under pressure so as not to be released and a second sub-step in which the melted polymer is made to flow out again to eliminate the possible waste material still present in the filter assembly.

6. The cleaning method according to claim 3, further comprising a step of producing a hammer effect, following said step of draining the waste product, consisting of a first sub-step in which the melted polymer is kept under pressure so as not to be released and a second sub-step in which the melted polymer is made to flow out again to eliminate the possible waste material still present in the filter assembly.

* * * * *